F. P. McCOLL AND W. W. WILLISON.
FOOD COMPOUND.
APPLICATION FILED JULY 1, 1918.
1,335,383.
Patented Mar. 30, 1920.
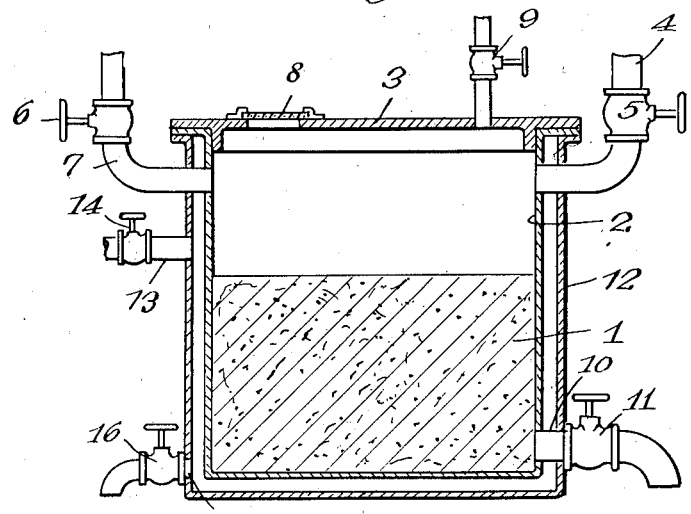

UNITED STATES PATENT OFFICE.

FRANCIS P. McCOLL, OF RIDGEWOOD, NEW JERSEY, AND WALTER W. WILLISON, OF NEW YORK, N. Y., ASSIGNORS TO THERMOKEPT PRODUCTS CORPORATION, OF NEW YORK, N. Y., A CORPORATION OF MAINE.

FOOD COMPOUND.

1,335,383.  Specification of Letters Patent.  Patented Mar. 30, 1920.

Application filed July 1, 1918. Serial No. 242,934.

*To all whom it may concern:*

Be it known that we, FRANCIS P. McCOLL, a citizen of Canada, and a resident of Ridgewood, in the county of Bergen and State of New Jersey, and WALTER WILLIAM WILLISON, a citizen of the United States, and a resident of New York, in the county of New York and State of New York, have invented certain new and useful Improvements in Food Compounds, of which the following is a specification.

Our invention relates to preserving and also to canning cheese, as well as to the cheese so treated as an article of manufacture, and to the sealed package in which the cheese may be canned.

The ordinary commercial cheese of commerce has 30 to 40% of moisture. By our invention we reduce this percentage of moisture by adding powdered milk, preferably powdered skimmed milk, to the cheese so as to materially reduce the percentage of moisture in the resultant mixture, after the cheese has been preferably, though not necessarily, comminuted or broken up in any suitable manner.

We then add to the mixture some edible binder. The resulting cheese may be sold without further treatment. Preferably, if the cheese is to be kept for any length of time, we subject it to a vacuum sufficiently high to withdraw its occluded air and any free gases. The product so treated may be sold as an article of manufacture and will keep in a sweet and wholesome condition much longer than if it had not been so treated. Preferably, we can it in any suitable receptacle sealing the receptacle *in vacuo* by any suitable means, such as by a vacuum canning machine now well known in the art.

The cheese so treated and canned does not have to be processed so that its flavor will not be impaired by this cooking. It keeps its original delicacy of flavor indefinitely and will not deteriorate while it is in the can or receptacle in which it is sealed.

We have obtained excellent results by mixing with the cheese sufficient powdered milk, preferably powdered skimmed milk, so that the proportion of moisture in the resultant mixture will be about 20 per cent. or lower. We reduce the percentage of moisture in the resulting mixture sufficiently to form it into a non-cohesive mass. We then mix with this mass some form of edible binder, such for example, as cotton seed oil, cocoanut oil, butter, peanut butter, or any other suitable vegetable or animal fat, or combination of the same, so that when added to the non-cohesive mass it will make the mass smooth and cohesive permitting it to be readily spread.

The mixture may be made either in a vacuum kettle, or it may be mixed in a vessel and then subsequently put into a vacuum kettle where it is subjected to a vacuum sufficiently high to withdraw the occluded air from the mixture together with any free gases. The vacuum which we preferably use is about 28 inches or higher. The mixture is then removed, in any suitable manner, from the vacuum kettle and can be sold in that condition. Preferably, and particularly, if it is desired to keep the cheese for a long period of time it is placed in suitable receptacles and sealed *in vacuo*. This sealing may be by a vacuum canning machine now well known in the trade. The cheese may then be placed directly in a receptacle, such as a tin can; or, in some cases, we place it in an inner receptacle or carton, and then seal that carton with its contained cheese in the other metal can or other receptacle.

It is obvious that our invention may be carried out by any suitable means and that it is not to be confined to any particular form of apparatus.

For the purpose of more clearly describing our invention we have shown it in connection with the accompanying diagrammatic drawing, in which the same reference numerals refer to the similar parts in the several figures.

Figure 1 is a vertical section through a vacuum kettle which may be employed to carry out our improved method.

Fig. 2 is a vertical section through a receptacle, in the form of a tin can, in which the treated cheese has been canned *in vacuo*.

Fig. 3 is a vertical section of an inner non metallic carton, preferably formed of paper, which may, or may not, be used.

Fig. 4 is a perspective view of a cover for the carton shown in Fig 3.

Fig. 5 is a vertical section of a package formed of an inner non-metallic carton and an outer receptacle in the form of a tin can.

In the accompanying drawing 1 is a mixture of cheese and powdered milk which is preferably, though not necessarily, powdered skimmed milk. The cheese is preferably though not necessarily, broken up or comminuted in any suitable manner, and mixed with the powdered milk, either in another vessel or receptacle, or in the vacuum kettle 2. When the resultant mass has become crumbly and non-cohesive some suitable edible binder is mixed with the mass 1 so as to make it smooth and cohesive, permitting it to be spread. Various edible binders may be used such, for example, as cottonseed oil, cocoanut oil, butter, peanut butter, or any edible vegetable or animal fat, or mixture of the same. The edible binder may be fed directly into the vacuum kettle 2 before the removable cover 3 is placed upon the vacuum kettle, or it may be fed through the intake 4 by controlling the valve 5.

When the resulting cheese has become cohesive, by the use of the edible binder, the cover 3 is placed upon the vacuum kettle, if this has not been previously done, and the contents are subjected to a high vacuum by opening the valve 6 in the pipe 7 leading to a vacuum machine (not shown). We preferably use a vacuum of about 28 inches or higher. This vacuum withdraws all the occluded air from the mass 1 as well as all free gases. When the operator looking through the window 8 sees that the vacuum process has been completed, he closes the valve 6 and opens the valve 9, to break the vacuum in the vacuum kettle 2. The treated cheese 1 may be then withdrawn from the vacuum kettle 2 in any suitable manner, or in some cases it may be forced out of the pipe 10, past the valve 11.

We may surround the vacuum kettle with a steam or hot water jacket 12 having an intake 13 controlled by a valve 14 and a drain 15 controlled by the valve 16.

The treated and vacuumized cheese may be sold as an article of manufacture and will keep much longer than if it had not been treated by our process. Preferably, and particularly if the cheese is to be shipped or kept a long period of time and subjected to changes of temperature, we can it by putting it in any suitable receptacle and sealing that receptacle *in vacuo*. We may for example place the cheese in the metal cans 17 Fig. 2, the metal cap being sealed on the can after first exhausting the air from within the can, preferably in a vacuum canning machine now well known in the trade.

In some cases we may place the treated cheese 1 in an inner carton preferably formed of non-metallic material, as paper 19, and place on that carton a non-metallic cap 20 having one or more pin holes 21. This inner carton 19, with its cap 20, is then placed in an outer container, usually a metal can 17. In sealing this package, in a vacuum canning machine the machine exhausts all the air from the carton 19 through the pin holes 21 and also from the interior of the metal can 17, before the metal cap 18 is sealed on the tin can 17. As soon as the vacuum in the machine is broken, so far as the particular can 17 under treatment is concerned, the atmospheric pressure will immediately dish the portion 22 of the metal cap 18 and cause it to bear with considerable pressure on the cap 20 and seal the openings 21, 21, as well as prevent any relative movement between the carton 19 and the metal can 17.

Having thus described our invention to the details of which we do not desire to be limited, what is claimed as new, and what it is desired to secure by Letters Patent is set forth in the appended claims.

1. A smooth and cohesive food compound composed of cheese having a moisture content of from thirty to forty per cent., powdered milk sufficient to reduce the percentage of water to a point where the mixture of cheese and milk is non-cohesive and an edible binder in sufficient quantity to make the compound smooth and cohesive.

2. A food compound composed of cheese having a moisture content of from thirty to forty per cent., powdered milk sufficient to reduce the percentage of water to a point where the mixture of cheese and milk is non-cohesive, and cotton seed oil in sufficient quantity to make the compound smooth and cohesive.

FRANCIS P. McCOLL.
WALTER W. WILLISON.

Witnesses:
CHRYSTINE GLASER,
JAMES F. KELLY.